(12) United States Patent
Stilson

(10) Patent No.: US 9,855,458 B2
(45) Date of Patent: Jan. 2, 2018

(54) CLAMPING DEVICE

(71) Applicant: Tyler Scott Stilson, Frederick, CO (US)

(72) Inventor: Tyler Scott Stilson, Frederick, CO (US)

( * ) Notice: Subject to any disclaimer, the term of this patent is extended or adjusted under 35 U.S.C. 154(b) by 0 days.

(21) Appl. No.: 14/943,024

(22) Filed: Nov. 16, 2015

(65) Prior Publication Data
US 2017/0144012 A1    May 25, 2017

Related U.S. Application Data

(60) Provisional application No. 62/080,168, filed on Nov. 14, 2014.

(51) Int. Cl.
*A63B 21/072* (2006.01)
*F16B 2/18* (2006.01)

(52) U.S. Cl.
CPC .......... *A63B 21/0728* (2013.01); *F16B 2/185* (2013.01)

(58) Field of Classification Search
CPC .......... A63B 21/0004; A63B 21/00058; A63B 21/00069; A63B 21/00072; A63B 21/02; A63B 21/023; A63B 21/025; A63B 21/026; A63B 21/04; A63B 21/0407; A63B 21/0414; A63B 21/0421; A63B 21/0428; A63B 21/0435; A63B 21/0442; A63B 21/045; A63B 21/0455; A63B 21/05; A63B 21/055; A63B 21/0552; A63B 21/0555; A63B 21/0557; A63B 21/06; A63B 21/072; A63B 21/0722; A63B 21/0724; A63B 21/0726; A63B 21/0728; A63B 21/075; A63B 21/08; A63B 21/15; A63B 21/151; A63B 21/159; A63B 21/4023; A63B 21/4027; A63B 21/4033; A63B 21/4035; A63B 21/4043; A63B 21/4045; A63B 21/4047; A63B 21/4049; A63B 71/0054;
(Continued)

(56) References Cited

U.S. PATENT DOCUMENTS 2,244,351 A * 6/1941 Venables ............ A63B 21/0728
403/344
3,305,234 A * 2/1967 Cline ................. A63B 21/0728
24/270
(Continued)

FOREIGN PATENT DOCUMENTS

WO   WO 2015134826 A2 * 9/2015 ......... A63B 21/0724
ZA   WO 2017046731 A1   3/2017

*Primary Examiner* — Loan H Thanh
*Assistant Examiner* — Gary D Urbiel Goldner
(74) *Attorney, Agent, or Firm* — Antonio L. Converse, Esq.

(57) ABSTRACT

A clamping device for securely engaging one or more objects through the application of pressure. The clamping device includes a primary member having opposed interior and exterior surfaces. The primary member has a generally cylindrical shape such that the interior surface defines a generally circular space about a center point of the primary member. The clamping device can receive an elongated member through the generally circular space circumscribed by the primary member. The primary member is adapted for clamping and releasing such that the clamping device may releasably engage the elongated member. The elongated member is securely retained by the clamping device through the application of pressure.

2 Claims, 7 Drawing Sheets

(58) Field of Classification Search
CPC .... A63B 2071/0063; A63B 2071/0072; A63B 2071/0081; A63B 2071/009; A63B 2209/14; A63B 2225/09; A63B 2244/09
See application file for complete search history.

(56) References Cited

U.S. PATENT DOCUMENTS

| | | | | |
|---|---|---|---|---|
| 4,569,105 | A * | 2/1986 | Weider | A63B 21/0728 24/544 |
| 4,639,979 | A * | 2/1987 | Polson | A63B 21/0728 24/273 |
| 5,062,631 | A * | 11/1991 | Dau | A63B 21/0728 403/330 |
| 5,295,933 | A * | 3/1994 | Ciminski | A63B 21/0728 24/270 |
| 5,591,109 | A * | 1/1997 | Strnad | A63B 21/0728 24/524 |
| 7,789,814 | B1 * | 9/2010 | Xu | A63B 21/0728 482/107 |
| 8,142,335 | B1 * | 3/2012 | Leach | A63B 21/0728 482/107 |
| D694,841 | S * | 12/2013 | Ciminski | D21/681 |
| 8,827,878 | B1 * | 9/2014 | Ciminski | A63B 21/0728 482/107 |
| D764,608 | S * | 8/2016 | Jones | D21/694 |
| D766,384 | S * | 9/2016 | Jones | D21/694 |
| 2008/0287271 | A1 * | 11/2008 | Jones | A63B 21/0728 482/107 |
| 2011/0162173 | A1 * | 7/2011 | Ciminski | A63B 21/0728 24/303 |
| 2013/0072359 | A1 * | 3/2013 | Leach | A63B 21/0004 482/107 |
| 2013/0196830 | A1 * | 8/2013 | Pfitzer | A63B 21/0602 482/110 |
| 2014/0121075 | A1 * | 5/2014 | Brown | A63B 21/026 482/106 |
| 2014/0162855 | A1 * | 6/2014 | Beckman | A63B 21/0728 482/139 |
| 2014/0200119 | A1 * | 7/2014 | Sides, Jr. | A63B 21/0618 482/106 |
| 2014/0287889 | A1 * | 9/2014 | Grace | A63B 21/0728 482/106 |
| 2015/0231441 | A1 * | 8/2015 | Davies, III | A63B 21/0728 482/107 |
| 2016/0025121 | A1 * | 1/2016 | Ahnert | B25B 5/08 16/421 |

* cited by examiner

CLAMPING DEVICE

CROSS-REFERENCE TO RELATED APPLICATION

This application claims the benefit of U.S. Provisional Patent Application Ser. No. 62/080,168, filed on Nov. 14, 2014.

BACKGROUND OF THE INVENTION

1. Field of the Invention

The present invention relates generally to clamping devices. More particularly, the present invention relates to a device used to secure weights on exercise equipment.

2. Description of the Related Art

A clamping device is an apparatus that engages one or more objects for the purpose of securely retaining the object or objects. Design considerations for clamping devices include overall size, weight, number of component parts, means for joining component parts, quality of feedstock, likelihood of improper use, ability to prevent movement and separation when engaging multiple objects, propensity to become deformed or break through use, and means for engaging and releasing the device.

These design considerations will affect whether a clamping device is able to function reliable and in what circumstances. It is possible for more than one of the identified considerations to impact a single design feature. Typically, clamping devices take a limited number of the above design factors into consideration.

Thus, a clamping device capable of reliably engaging one or more objects securely may be too large or heavy for the intended use. Alternatively, such a clamping device may sacrifice ease of use for reliability. Providing for the use of additional tools can increase the ability of a clamping device to securely engage an object, while making the device more difficult to use. Ease of use can also influence whether a clamping device is regularly used or adopted by potential users.

Another potential tradeoff is a reduction in the quality of feedstock to reduce production cost. Clamping devices constructed at least in part from inexpensive or substandard material can degrade through both use and the passage of time.

It is also desired that the clamping device not damage an engaged object or objects. A clamping device that allows a user to determine the distance between the points of contact between the device and a target object can be over tightened, increasing the possibility of damage to the object. Also, if a contact surface of a clamping device is made of coarse materials it is more likely to damage a retained object. The likelihood that damage will occur with such a device is increased if it is used during high impact activities.

Clamping devices are commonly used during weight training to reduce conditions that restrict performance of an exercise or the ability to perform an exercise in a safe manner. Undesirable conditions include instability, imbalance, oscillation of movable parts, and separation of removable components from assemblies, equipment or apparatuses. These conditions pose a safety risk due to potential injuries.

To limit these undesirable conditions, a clamping device is favored that is able remain securely engaged throughout the entire movement required of an exercise. It is also desirable for the clamping device to remain securely engaged throughout all successive repetitions of the exercise.

A common training assembly used during weight training is a barbell with removable weights loaded on in it. A clamping device can be employed to prohibit separation of the removable weights of that assembly. Additionally, a clamping device that can securely engage the barbell is desirable to prevent movement of the weights while on the barbell.

Moreover, removable weights often incorporate a sleeve positioned around their inside surface that contacts the exterior surface of the barbell. Clamping devices used to retain the weights on the barbell can damage the sleeve if the surface area that contacts the weight is insignificant due to the thickness of the clamping device.

Clamping devices which attempt to address more than one of the identified problems are often difficult to manufacture. More difficult still to manufacture such clamping devices economically. Thus, a clamping device that solves more than one of the aforementioned problems is desired.

SUMMARY OF THE INVENTION

A clamping device is disclosed for securely engaging one or more objects through the application of pressure. The clamping device includes a primary member having opposed interior and exterior surfaces. The primary member has a generally cylindrical shape such that the interior surface defines a generally circular space about the center point of the primary member. The clamping device can receive an elongated member through the generally circular space circumscribed by the primary member.

The clamping device is adapted for clamping and releasing and incorporates a means for releasably engaging the elongated member. The means for releasably engaging the elongated member has opposed open and closed positions. The means for releasably engaging the elongated member is attached to the primary member such that when the means for releasably engaging the elongated member is in the closed position, the elongated member is securely engaged by the clamping devices through the application of pressure.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
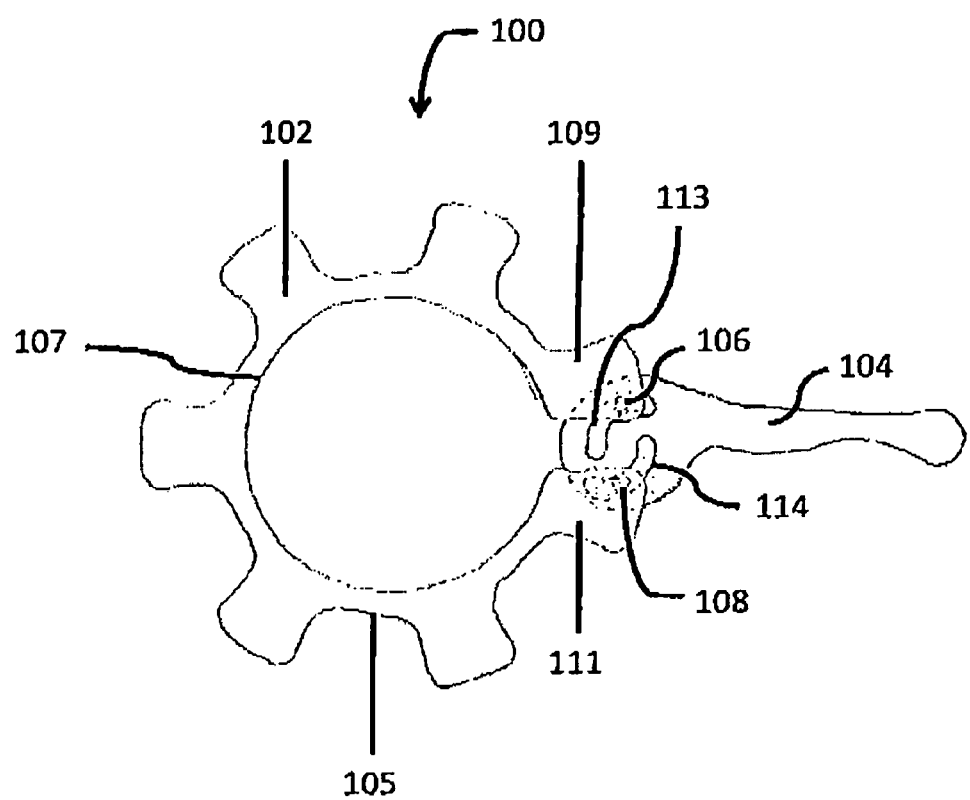
FIG. 1 is an end view of an exemplary embodiment of the invention in the opened position.
Figure 2:
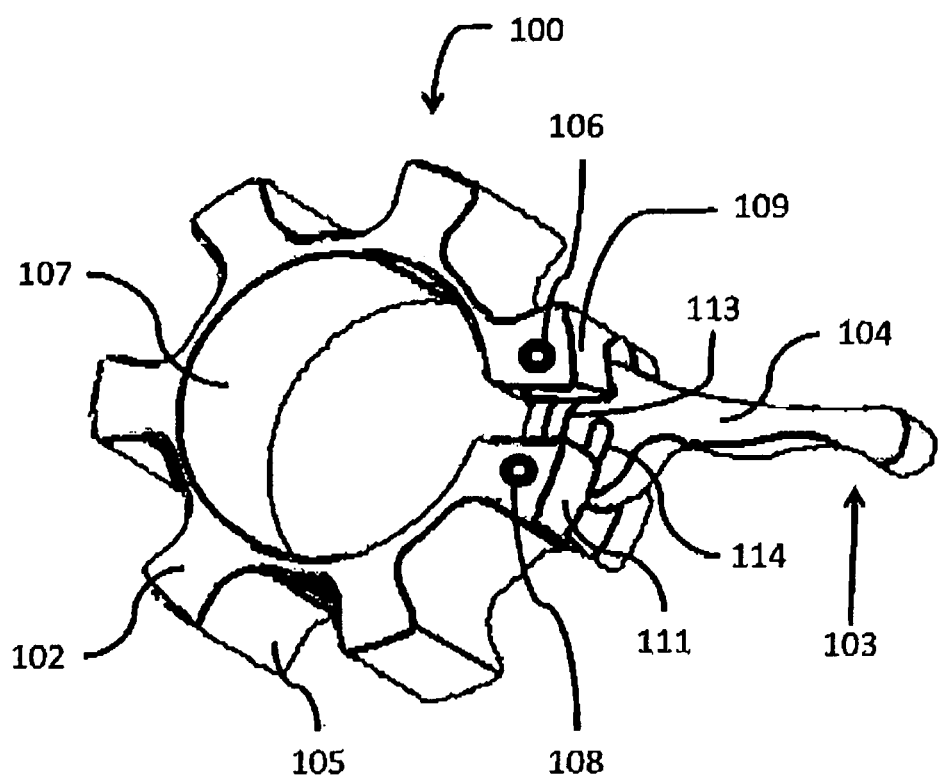
FIG. 2 is perspective view of an exemplary embodiment of the invention in the opened position.

In various exemplary embodiments, the present invention relates to a clamping device 100. As shown in the exemplary embodiment in FIG. 3, the clamping device 100 securely retains one or more objects through the application of pressure. A perspective view of one embodiment of the clamping device is shown in FIG. 2. As illustrated in FIG. 2, the clamping device 100 is shown with a primary member 102 that is generally cylindrical. The primary member 102 is one continual piece throughout its length. The primary member 102 having an interior surface 107 and an opposed exterior surface 105. The interior and exterior surfaces 107, 105 follow a generally circular path about the center of the primary member 102.

Figure 7:
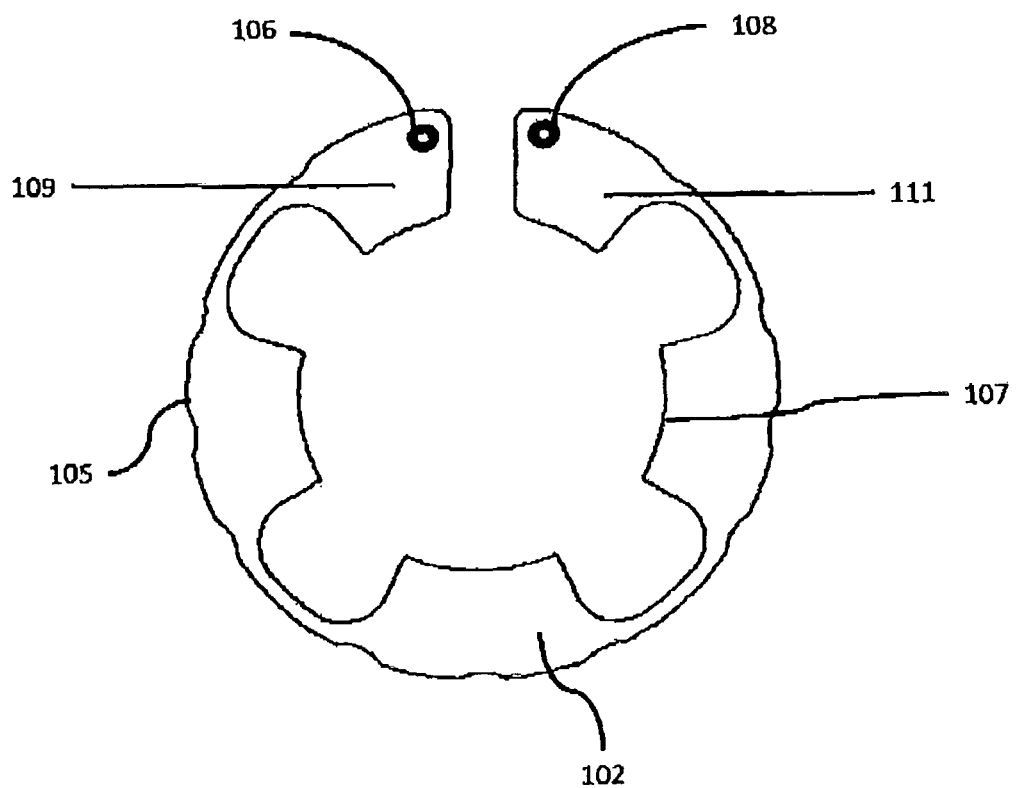
FIG. 7 is an end view of another exemplary embodiment of the invention.

In the particular embodiment shown in FIG. 2, the exterior surface 105 follows a generally parabolic path when the clamping device 100 is observed from an end view. The pattern displayed by the exterior surface 105 in this embodiment is optional. Other potential patterns include those that are substantially triangular or crescent when viewing the clamping device 100 from an end view. FIG. 7 shows the exterior surface 105 remaining generally circular around the circumference of the primary member 102. The opposed interior surface 107 moving closer and further away from the exterior surface 105 as the interior and exterior surfaces 107, 105 move in a generally circular direction about the center of the primary member 102.

FIG. 2 further shows the primary member 102 with two extremities 109, 111. The primary member being sufficiently rigid to bias the first extremity 109 away from the second extremity 111. The two extremities 109, 111 being sufficiently distant from each other 109, 111 to allow one or more objects to pass through the center of the primary member 102 (not shown). An elongated member being one such potential object. The clamping device 100 having a means for releasably engaging 104 such elongated member. In this particular embodiment, each of the two extremities 109, 111 is joined to the means for releasably engaging the elongated member 104. Further, in this embodiment, the means for releasably engaging the elongated member is a lever 104. The lever 104 is a preferred means for releasably engaging the elongated member, but not required.

FIG. 2 further shows the lever 104 in an open position 103. Lever 104 will cause the clamping device 100 to engage the elongated member by transitioning from the open position 103 to a closed position 115. In this embodiment, pins 106, 108 are vertically oriented parallel to the interior and exterior surfaces 107, 105. Each pin 106, 108 extends the height of one extremity 109, 111. The pins 106, 108 join the lever 104 to each extremity 109, 111 by extending vertically through counterposed arcuate holes 113, 114 formed through the lower end of the lever 104.

Figure 3:
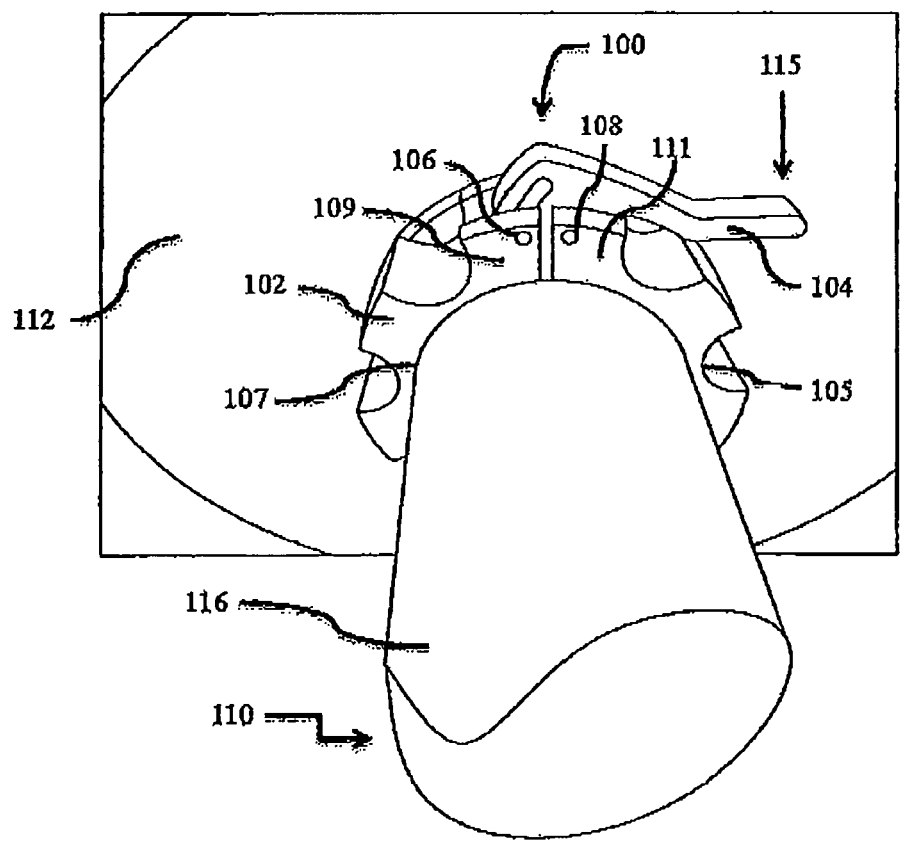
FIG. 3 is a perspective view of an exemplary embodiment of the invention in the closed position.

FIG. 2 further shows lever 104 pivots radially about the midpoint of the pins 106, 108 approximately ninety degrees to transition from the open position 103 to the closed position 115. FIG. 3 shows lever 104 causing the clamping device 100 to engage a barbell by being positioned in the closed position 115. In this embodiment, lever 104 decreases the circumference and diameter of the primary member 102 simultaneously when transitioning from the open position 103 to the closed position 115. FIG. 3 further shows clamping device 100 protecting a sleeve positioned around the inside surface of the weight that contacts the exterior surface of the barbell by radially extending from the center of the barbell higher than the interior surface of the weight.

Figure 4:
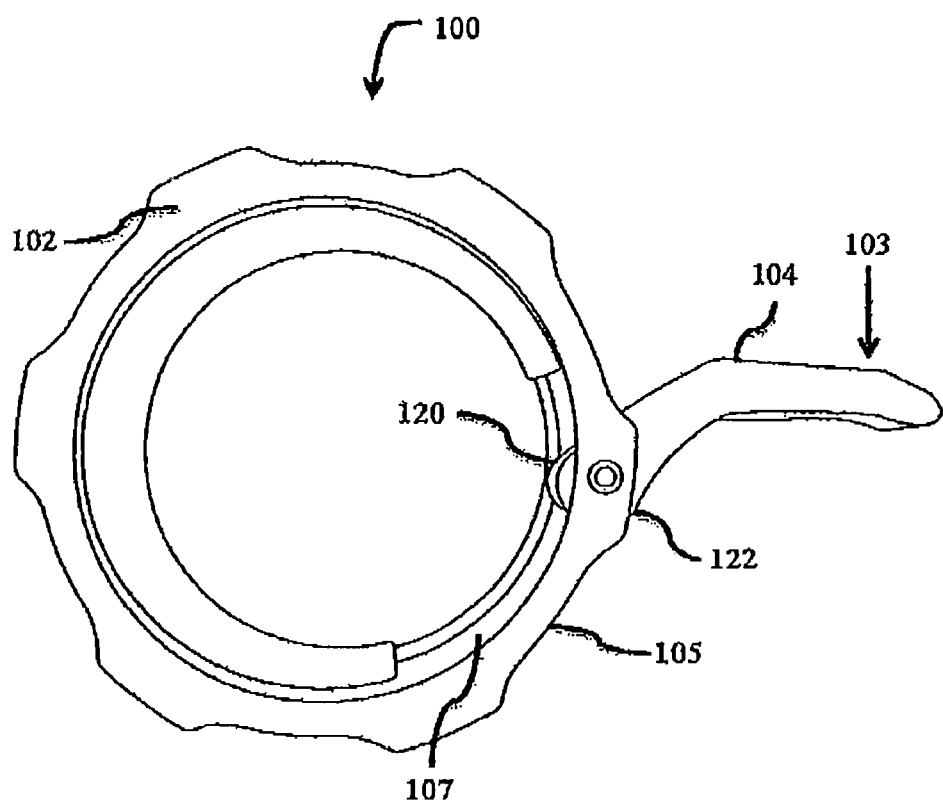
FIG. 4 is a perspective view of another exemplary embodiment of the invention in the open position.
Figure 5:
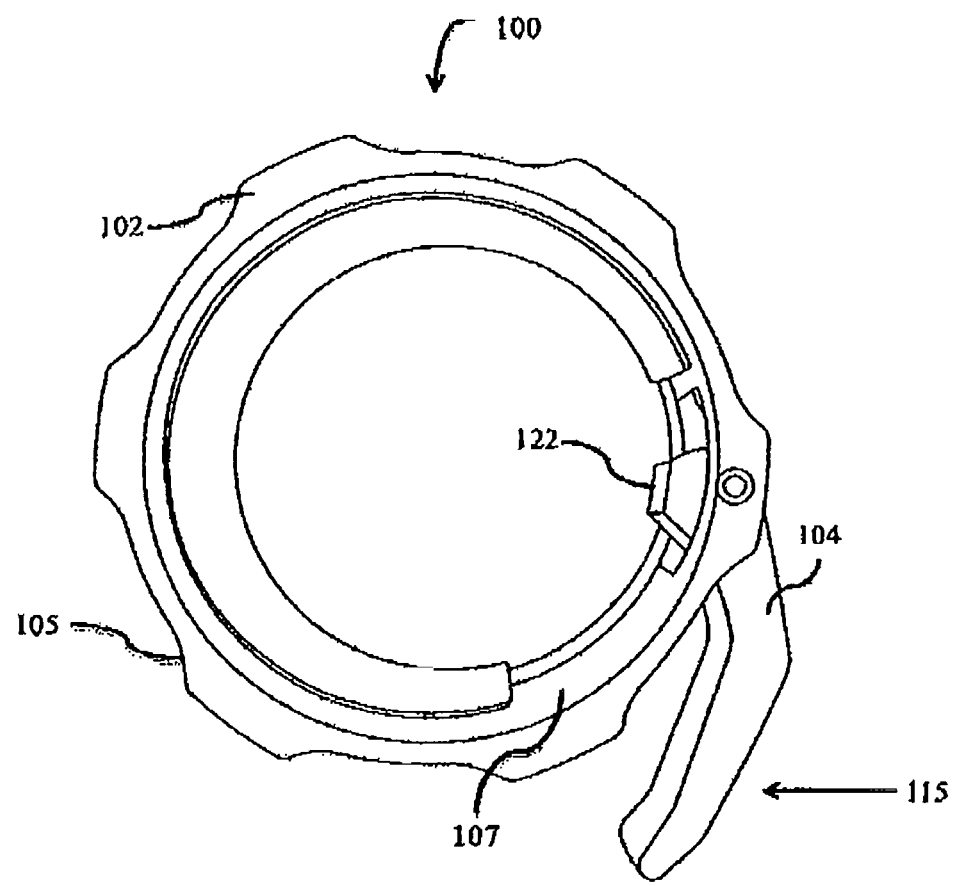
FIG. 5 is a perspective view of an exemplary embodiment of the invention in the closed position.
Figure 6:
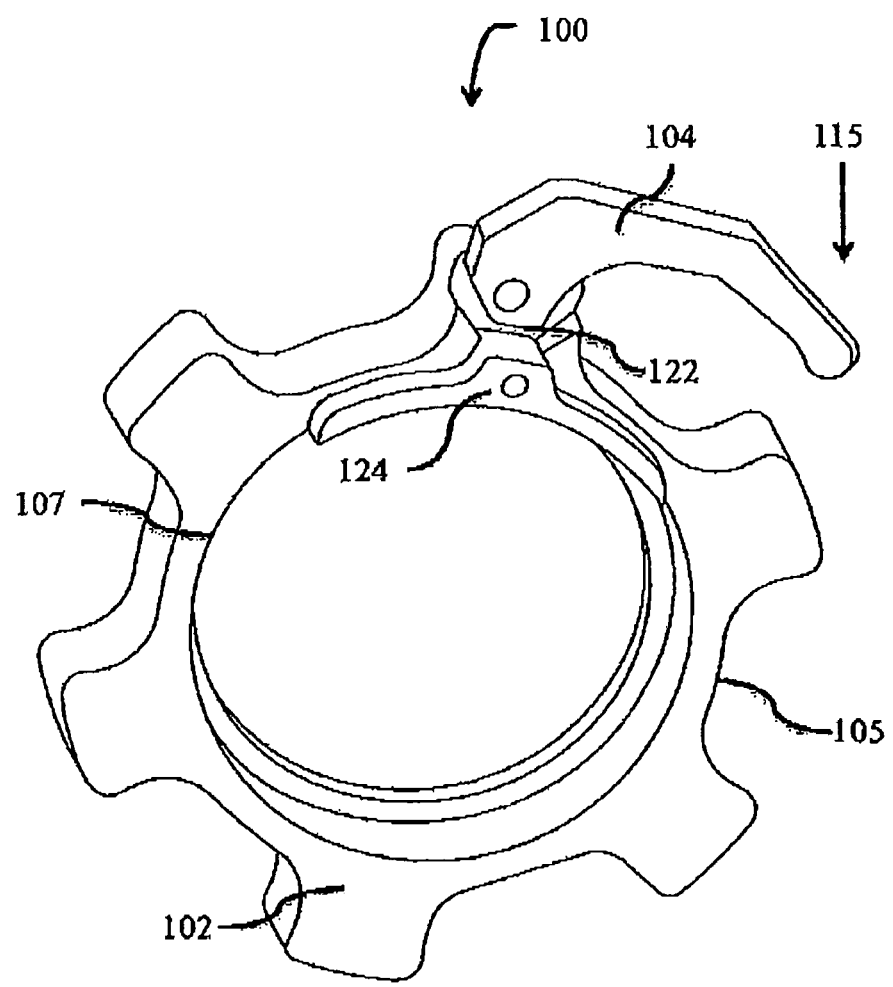
FIG. 6 is a perspective view of another exemplary embodiment of the invention in the opened position.

FIGS. 4 and 5 show another exemplary embodiment of the clamping device 100 where the means for releasably engaging the elongated member 104 having an upper end 120 and a lower end 122 such that when said means for releasably engaging the elongated member 104 is in the closed position 115 the lower end thereof 122 extends below the interior surface 107 of said primary member 102 to contact the elongated member. FIG. 4 shows the means for releasably engaging the elongated member 104 in the open position 103. FIG. 6 shows another exemplary embodiment of the clamping device 100 where lower end 122 of means for releasably engaging the elongated member 104 depresses an engaging agent 124.

The clamping device 100 can be created using multiple types of feedstock, that is to say the main raw material used in the manufacture of a product. In one exemplary embodiment, the clamping device 100 is made from an aluminum alloy (not indicated). In a preferred embodiment, the aluminum alloy 6061 Billet, formerly referred to as Alloy 61S. Other preferred materials for construction of the clamping device 100 include plastics (not indicated) and steel (not indicated). It is also possible to use different materials to construct different component parts of the clamping device 100.

The preferred embodiment easily and quickly engages the exercise equipment. The preferred embodiment is also able to easily and quickly disengaged from the exercise equipment to allow for weights to be conveniently removed or added to the exercise equipment.

It should be understood that the invention is not limited in its application to the details of the particular arrangement shown here since the invention is capable of other embodiments, some of which may be quite different from those of the disclosed embodiments. While the foregoing written description of the invention enables one of ordinary skill in the art to make and use what is presently considered by the inventor to be the best mode of the invention, a device may be practiced which incorporates other structural and/or functional details in addition to or other than the structural and/or functional details set forth herein. It should therefore be understood that the present invention is not limited to the embodiments described above, but encompasses any and all embodiments within the scope and spirit of the invention as claimed.

I claim:

1. A clamping device, comprising:
a primary member having opposed interior and exterior surfaces, said primary member having a generally cylindrical shape such that the interior surface circumscribes a generally circular space around a center point of said primary member, whereby the primary member can receive an elongated member through the generally circular space, said primary member being adapted for clamping and releasing;
a means for releasably engaging the elongated member, said means for releasably engaging the elongated member having an open position and a closed position, said means for releasably engaging the elongated member is attached to said primary member such that when said means for releasably engaging the elongated member is in the closed position the elongated member is securely engaged through the application of pressure;
said primary member is made of an aluminum alloy that comprises between about 0.4 wt % and about 0.8 wt % of Silicon (Si), between about 0 wt % and about 0.7 wt % of Iron (Fe), between about 0.15 wt % and about 0.4 wt % of Copper (Cu), between about 0 wt % and about 0.15 wt % of Manganese (Mn), between about 0.8 wt % and about 1.2 wt % of Magnesium (Mg), between about 0.04 wt % and about 0.35 wt % of Chromium (Cr), between about 0 wt % and about 0.25 wt % of Zinc (Zn), between about 0 wt % and about 0.15 wt % of Titanium (Ti), no more than 0.15 wt % of other elements combined, no more than 0.05 wt % of any other individual element, between about 95.85 wt % and about 98.56 wt % of Aluminum (Al).

2. A clamping device, comprising:

a generally cylindrical body adapted for clamping and releasing, said generally cylindrical body having opposed interior and exterior surfaces, said generally cylindrical body having a first end and a second end, the first end thereof having an outer surface and the second end of said generally cylindrical body having an outer surface, the opposed interior and exterior surfaces begin at the outer surface of the first end of said generally cylindrical body and follow a generally circular path to the outer surface of the second end of said generally cylindrical body such that the generally cylindrical body can receive an elongated member through its center;

a lever having an open position and a closed position, said lever is attached to said generally cylindrical body such that when said lever is engaged the first end of said generally cylindrical body is forced closer to the second end of said generally cylindrical body causing the elongated member to be securely and releasably engaged;

said clamping device is made of an aluminum alloy that comprises between about 0.4 wt % and about 0.8 wt % of Silicon (Si), between about 0 wt % and about 0.7 wt % of Iron (Fe), between about 0.15 wt % and about 0.4 wt % of Copper (Cu), between about 0 wt % and about 0.15 wt % of Manganese (Mn), between about 0.8 wt % and about 1.2 wt % of Magnesium (Mg), between about 0.04 wt % and about 0.35 wt % of Chromium (Cr), between about 0 wt % and about 0.25 wt % of Zinc (Zn), between about 0 wt % and about 0.15 wt % of Titanium (Ti), no more than 0.15 wt % of other elements combined, no more than 0.05 wt % of any other individual element, between about 95.85 wt % and about 98.56 wt % of Aluminum (Al).

\* \* \* \* \*